(12) United States Patent
Shinde et al.

(10) Patent No.: US 12,340,384 B2
(45) Date of Patent: Jun. 24, 2025

(54) SYSTEMS AND METHODS FOR EXECUTING QUERIES ON A BITMAP INDEX

(71) Applicant: Capital One Services, LLC, McLean, VA (US)

(72) Inventors: Swapnil Shinde, Ashburn, VA (US); William Ibekwe, Riverside, CA (US); Sarah Schmidt, Spring Lake, MI (US); David Welgus, Queens, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/607,735

(22) Filed: Mar. 18, 2024

(65) Prior Publication Data
US 2024/0221011 A1 Jul. 4, 2024

Related U.S. Application Data

(63) Continuation of application No. 17/317,722, filed on May 11, 2021, now Pat. No. 11,966,936.

(51) Int. Cl.
*G06Q 30/0204* (2023.01)
*G06F 16/22* (2019.01)
(Continued)

(52) U.S. Cl.
CPC ..... *G06Q 30/0204* (2013.01); *G06F 16/2237* (2019.01); *G06F 16/24568* (2019.01); *G06N 3/02* (2013.01)

(58) Field of Classification Search
CPC ............ G06Q 30/0204; G06F 16/2237; G06F 16/2468; G06N 3/02; G06N 3/04; G06N 3/09
See application file for complete search history.

(56) References Cited

U.S. PATENT DOCUMENTS 6,711,563 B1    3/2004  Koskas
8,051,069 B2 *  11/2011 Johnson ............ G06F 16/24568
                                                          707/718

(Continued)

FOREIGN PATENT DOCUMENTS

CN         106469218 B         11/2019
WO   WO-2008042461 A2 *   4/2008   ............ G06F 16/242
WO   WO-2022231901 A1 *   11/2022  ......... G06F 16/2462

*Primary Examiner* — Dylan C White
(74) *Attorney, Agent, or Firm* — TROUTMAN PEPPER LOCKE LLP; Christopher J. Forstner; John A. Morrissett

(57) ABSTRACT

Systems and methods for executing queries on a bitmap index are disclosed. The system may receive a first data stream from a database and generate a bitmap index based on the first data stream. The system may receive an input selection of one or more data conditions from a user device and generate a Boolean expression based on the input selection. The system may query the bitmap index using the Boolean expression and generate a bitmap vector. The system may output a first data subset represented by the generated bitmap vector to a graphical user interface. The bitmap index may include probabilistic entries, and the system may validate the probabilistic entries by receiving a second data stream, identifying one or more entries correlated to the probabilistic entries, determining a divergence between the identified entries and the probabilistic entries, and updating parameters of a classifier model associated with the probabilistic entries.

20 Claims, 8 Drawing Sheets

(51) Int. Cl.
  *G06F 16/2455* (2019.01)
  *G06N 3/02* (2006.01)

(56) References Cited

U.S. PATENT DOCUMENTS

| | | |
|---|---|---|
| 8,170,901 B2 | 5/2012 | Shukla et al. |
| 8,447,743 B2 | 5/2013 | Santosuosso |
| 8,682,923 B2 | 3/2014 | He |
| 8,745,658 B2 | 6/2014 | Carney et al. |
| 11,379,476 B2 | 7/2022 | Petride et al. |
| 2005/0154710 A1 | 7/2005 | Ruhlow et al. |
| 2016/0103869 A1* | 4/2016 | Raufman ............ G06F 16/2272 707/693 |
| 2018/0101621 A1* | 4/2018 | Lewak .................. G06F 16/242 |
| 2021/0406215 A1 | 12/2021 | Hughes et al. |

\* cited by examiner

SYSTEMS AND METHODS FOR EXECUTING QUERIES ON A BITMAP INDEX

CROSS-REFERENCE TO RELATED APPLICATIONS

This application is a continuation of, and claims priority under 35 U.S.C. § 120 to, U.S. patent application Ser. No. 17/317,722, filed May 11, 2021, the entire contents of which are fully incorporated herein by reference.

FIELD

The disclosed technology relates to systems and methods for identifying a data subset, and more particularly generating Boolean queries identifying a data subset in a bitmap index according to one or more data conditions.

BACKGROUND

Many organizations utilize targeted campaigns to offer services and/or products to their customers. To initialize a targeted campaign, a user must first identify a subgroup of customers to which to present a targeted campaign. Customer subgroups may be determined by querying a database with Boolean logic, such as customers that are credit card users AND account-holders. However, there are many drawbacks to traditional systems that provide methods of querying a database with Boolean expressions. Users of the system are required to input complicated Boolean expressions in order to determine appropriate customer subgroups. Additionally, directly querying a traditional database is time-consuming and inefficient due to the large number of entries that must be parsed to successfully return a target customer subgroup.

SUMMARY

Disclosed herein are systems and methods for executing queries on a bitmap index. Consistent with the disclosed embodiments, a system for executing queries on a bitmap index is provided. The system includes one or more processors and memory in communication with the one or more processors and storing instructions that, when executed by the one or more processors, cause the system to perform one or more steps of a method for querying a bitmap index. The system may receive a first data stream from a data store. The system may generate a bitmap index of the first data stream. The system may receive, from a user via a graphical user interface, an input selection of one or more data conditions. The system may generate a Boolean expression based on the input selection of the one or more data conditions. The system may query the bitmap index using the Boolean expression. The system may generate a bitmap vector based on identifying bitmap index values that satisfy the one or more data conditions. The system may output a first data subset represented by the generated bitmap vector the graphical user interface.

Consistent with the disclosed embodiments, another system for executing queries on a bitmap index is disclosed. The system includes one or more processors and memory in communication with the one or more processors and storing instructions that, when executed by the one or more processors, cause the system to perform one or more steps of a method for querying a bitmap index. The system may receive a first data stream from a data store. The system may identify probabilistic data attributes in the first data stream according to a classifier model. The system may generate a bitmap index including probabilistic entries identified in the first data stream. The system may receive, from a user via a graphical user interface, an input selection of one or more data conditions. According to some embodiments, the one or more data conditions may include at least one propensity-based inquiry. The system may generate a Boolean expression based on the input selection of the one or more data conditions. The system may query the bitmap index using the Boolean expression. The system may generate a bitmap vector based on identifying bitmap index values that satisfy the one or more data conditions. The system may output a first data subset represented by the generated bitmap vector to the graphical user interface.

Consistent with the disclosed embodiments, a computer implemented method for executing queries on a bitmap index is disclosed. The method may include receiving an input selection of one or more data conditions from a graphical user interface. The method may include generating a Boolean expression based on the input selection of the one or more data conditions. The method may include querying a bitmap index using the Boolean expression. The method may include generating a bitmap vector based on identifying bitmap index values that satisfy the one or more data conditions. The method may include outputting a first data subset represented by the generated bitmap vector to the graphical user interface.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
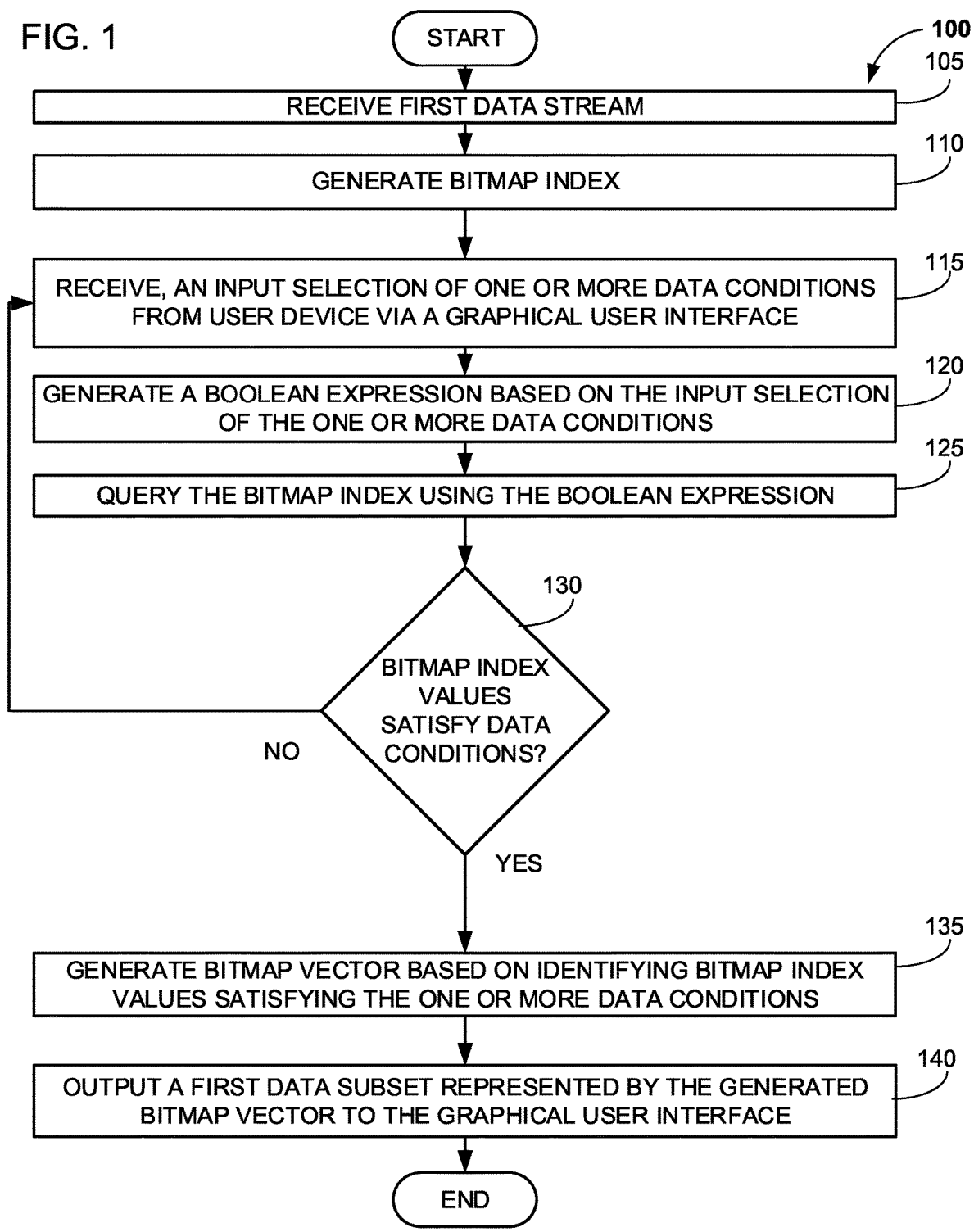
FIG. 1 is a flow diagram 100 illustrating examples of methods for executing a query on a bitmap index, in accordance with certain embodiments of the disclosed technology.

According to certain example implementations of the disclosed technology, systems and methods are disclosed herein for executing queries on a bitmap index according to one or more data conditions. For example, in a variety of aspects, a system is provided for generating bitmap index based on a data stream received from a data store, such as a database. A bitmap index generator may generate a bitmap index based on the data received from the data store. The data store may include customer profiles, customer financial information, customer interaction history, etc. For example, the data store may include information associated with each customer account the customer has with opened with a financial service provider, such as credit account, checking account, any loan products the customer has open with the financial service provider, such as home loan, auto loan, etc., and may also include account information such as a user's credit score, credit history, etc. The system may receive an input selection of one or more data conditions from a user, via a user device. According to some embodiments, the one or more data conditions may be generated based on a user's interaction with a graphical user interface provided on the user device. Based on the selected one or more data conditions selected graphically via the user device, a Boolean generator may generate a Boolean expression. The Boolean expression may be based on the input selection of the one or more data conditions by the user of user device, e.g., via a graphical user interface. The system may query the bitmap index using the Boolean expression. The system (e.g., Boolean generator) may determine that the bitmap index values satisfy the desired data conditions and subsequently generate a bitmap vector based on identifying bitmap index values satisfying the one or more data conditions. Accordingly, the system may output a first data subset represented by the generated bitmap vector to the graphical user interface of the user device. Accordingly, a system for querying and identifying target sub-populations is provided, without requiring a user of the system to manually execute Boolean queries. Additionally, a system for autonomously generating bitmap indexes is provided. Bitmap indexes are automatically created based on data streams received from a database, and allows for the execution of fast Boolean queries.

According to some embodiments, systems and methods for generating probabilistic based bitmap indexes is provided. The bitmap generator may include one or more machine learning models configured to generate probabilistic bitmap entries. The probabilistic bitmap entries may be based on predicted customer behavior associated with historical customer data. For example, the system may generate a probabilistic bitmap index associated with customers of a financial service provider that meet certain data conditions, and are at least 70% likely to apply for an automotive loan product within the next year. The probabilistic bitmap index may be generated by the machine learning models implemented by the bitmap generator. Additionally, the Boolean generator may be configured to generate at least one propensity-based query. For example, a user of the system may wish to target a demographic of users that are at least 70% likely to apply for an automotive loan product within the next year, who also have at least a credit account or a bank account open with a respective financial service provider. Accordingly, the Boolean generator may receive input from a user device and generate a propensity-based Boolean expression. The system may query the bitmap index using the propensity-based Boolean expression, generate a bitmap vector including bitmap index values that satisfy the propensity-based Boolean expression, and output a first data subset (e.g., target demographic) to the graphical user interface of the user device.

According to some embodiments, the machine learning model may be configured to receive a second data stream from the database and identify one or more second data stream entries correlated to the probabilistic bitmap index entries. The system may determine a second data subset (e.g., target demographic) based on the second data stream entries, and determine a divergence between the second data subset and the first data subset. When the divergence exceeds a predetermined threshold, the system (e.g., Bitmap generator) may update one or more parameters of the machine learning model based on the determined divergence. Accordingly, the system is capable of iteratively updating the accuracy of its ability to generate probabilistic bitmap index entries that are indicative of predictive target demographic populations.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram 100 illustrating examples of methods for executing a query on a bitmap index. Method 100 may be performed by some or all of Boolean generator 510, bitmap generator 512, validation device 514, database 516, and user device 520, or any useful combination thereof.

In block 105, the system may receive a first data stream. The first data stream may be received by bitmap generator 512. The first data stream may be received from a database, such as database 516. The first data stream may include customer data, which may data representative of a yearly income for each customer stored in a database, a credit score associated with each customer stored in a database, a number of accounts associated with a respective customer with a respective financial service provider, the type of accounts a respective customer has with a financial service provider, financial transactions the customer has performed with one or more financial accounts associated with the financial service provider, etc. According to some embodiments, customer data may additionally include demographic customer information such as marital status, number of children, a geographic location associated with a respective customer, etc. According to some embodiments, customer data may also include previous customer interactions with a financial service provider (e.g., fraud notices associated with a respective customer account, any calls made by a respective customer to a customer support line of a financial service provider, etc.). In some embodiments, the customer data may include categorical data values (e.g., specific values of a credit score such as a credit score of at least 800).

In many embodiments, customer data may be segmented into ranges for the first data stream (e.g., customer A having a credit score in the range of 700-800).

In block 110, the system (e.g., bitmap generator 512) may generate a bitmap index based on the received first data stream. According to some embodiments, the bitmap index may be a compressed bitmap index. For example, according to some embodiments of the present disclosure, each bitmap index may be compressed roaring bitmap index. Unlike run-length-encoding bitmap compression techniques, roaring bitmaps provide numerous advantages. For example, utilizing roaring bitmaps to provide bitmap compression allows for fast "AND," "OR," "XOR," and various other bitwise operations without requiring an entire bitmap index to first be decompressed before allowing for the use of index operations. Instead, roaring bitmaps allow for index operations while decompressing only parts of the bitmap index that are being queried. In block 115, the system (e.g., user device 520) may receive an input selection of one or more data conditions from a user device. According to some embodiments, the input selection is based on a user of user device 520 interacting with a graphical user interface presented to the user on user device 520. According to some embodiments, Boolean generator 510 may generate the graphical user interface and transmit the graphical user interface to user device 520, allowing the user of user device 520 to graphically select one or more data conditions to be applied to determine a target customer data subset. In block 120, the system (e.g., Boolean generator 510) may generate a Boolean expression based on the input selection of the one or more data conditions. For example, Boolean generator 510 may receive the one or more data conditions graphically selected by user device 520 and determine one or more Boolean expressions based on the one or more data conditions using a rules-based model (e.g. rules-based model 690, as described in more detail with respect to FIG. 6). In block 125, the system (e.g., Boolean generator 510) may query the bitmap index using the Boolean expression. According to some embodiments, querying the bitmap index may include identifying a first set of bitmap index values that satisfy a first data condition, identifying a second set of bitmap index values that satisfy a second data condition and determining a logical combination of bitmap index values that satisfy a logical combination of the first data condition and the second data condition. According to some embodiments, the logical combination of the first data condition and the second data condition may be based on a logical operator associated with the Boolean expression generated by Boolean generator 510.

In decision block 130, the system (e.g., Boolean generator 510 and/or bitmap generator 512) may determine whether the bitmap index values satisfy the one or more data conditions. When the one or more data conditions are not satisfied (e.g., when no subgroup can be identified satisfying all the provided data conditions) the system may return to block 115, in which the system may receive a new input selection of one or more data conditions. When the one or more data conditions are satisfied, the system may move to block 135, in which the system (e.g. bitmap generator 512) generates a bitmap vector. According to some embodiments, the bitmap vector may be generated based on identifying bitmap index values that satisfy the one or more data conditions. In block 140, the system (e.g., bitmap generator 512) may output a first data subset represented by the bitmap vector to the graphical user interface of user device 520. For example, the system may identify the data entries in database 516 that are correlated to the entries in the bitmap vector and accordingly output the first data subset of correlated entries from database 516 to user device 520.

Figure 2:
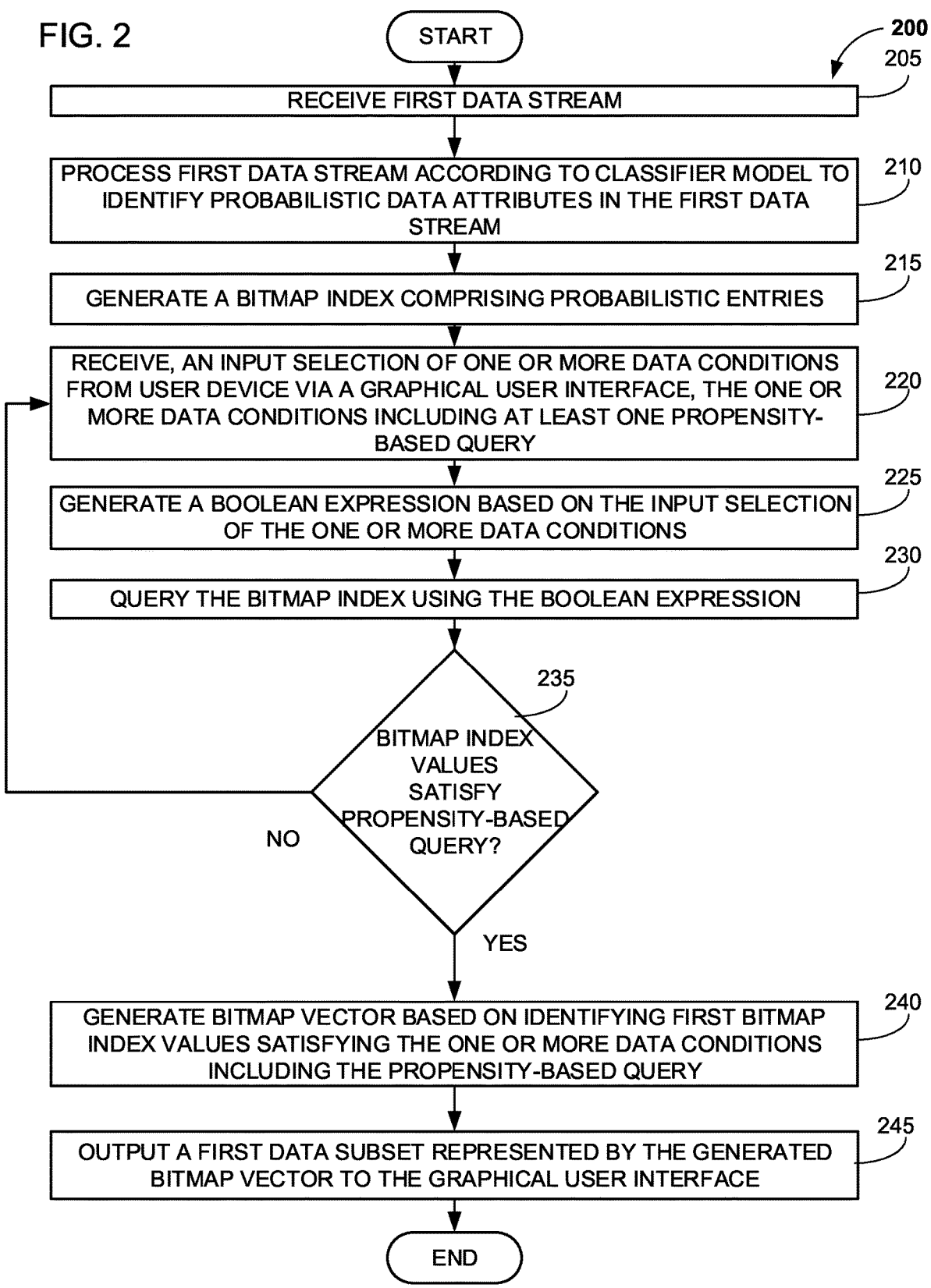
FIG. 2 is a flow diagram 200 illustrating example methods for identifying a data subset in a bitmap index based on a propensity-based query, in accordance with certain embodiments of the disclosed technology.

FIG. 2 is a flow diagram 200 illustrating example methods for identifying a data subset in a bitmap index based on a propensity-based query. Method 200 may be performed by some or all of Boolean generator 510, bitmap generator 512, validation device 514, database 516, and user device 520, or any useful combination thereof.

In block 205, the system may receive a first data stream. The first data stream may be received by bitmap generator 512. The first data stream may be received from a database, such as database 516. The first data stream may include customer data, which may data representative of a yearly income for each customer stored in a database, a credit score associated with each customer stored in a database, a number of accounts associated with a respective customer with a respective financial service provider, the type of accounts a respective customer has with a financial service provider, financial transactions the customer has performed with one or more financial accounts associated with the financial service provider, etc. In block 210, the system (e.g., bitmap generator 512) may process the first data stream according to a classifier model (e.g., machine learning model 795) to identify probabilistic data attributes in the first data stream. For example, the system may determine a probabilistic prediction that customers having an income above a predetermined threshold and that have at least one account registered with a financial service provider may be at least 70% likely to apply for a vehicle loan product in the next month from the financial service provider. In some embodiments, the system may determine probabilistic predictions based on a predicted likelihood of one or more customer actions, such as applying for a credit card, opening a checking account, downloading an application associated with a financial service provider, signing up for paperless billing, etc. In general, any desired customer action may be predicted by the system by generating a probabilistic bitmap index and identifying a target a population (e.g., data) subset based on the prediction.

In block 215, the system (e.g., bitmap generator 512) may generate a bitmap index including probabilistic entries. For example, returning to the above example, the bitmap index may include data entries representative of all customers that are at least 70% likely to apply for a vehicle loan product in the next month based on their income and having at least one account registered with the financial service provider. According to some embodiments, the system may generate range encoded bitmaps to represent the probabilistic data entries. A feature of range-encoded bitmaps is that the system may set not only a corresponding bit to a "1" when it evaluates as true, but also every bit that is greater than the actual value. For example, for a respective customer that is predicted to be at least 70% likely to apply for a vehicle loan product in the next month based on customer data, the system may generate a range-encoded bitmap having decimal values between 0 and 1, such as 0.001, 0.002, . . . , 0.999, and 1. For the customer in the example, any bitmap value equal to or greater than 0.7 (e.g., 0.7, 0.701, 0.702, . . . , 0.999, and 1) may evaluate to "1," whereas any bitmap value less than 0.7 would evaluate to "0." Encoding these probabilistic data entries as range-encoded bitmaps provides numerous benefits, such as greatly enhancing the speed with which range queries can be performed (e.g., such as answering the question which customers are 70% or more likely to apply for an auto loan based on collected historical customer data).

In block 220, the system (e.g., user device 520) may receive an input selection of one or more data conditions. According to some embodiments, the one or more data conditions may be graphically selected by the user of user device. According to some embodiments, the one or more data conditions may include at least one propensity-based query, such as a request to identify all customers that are at least 70% likely to apply for a vehicle loan product in the next month. In block 225, the system (e.g., Boolean generator 510) may generate a Boolean expression based on the input selection of the one or more data conditions. For example, Boolean generator 510 may receive the one or more data conditions graphically selected by user device 520 and determine one or more Boolean expressions based on the one or more data conditions. In block 230, the system (e.g., Boolean generator 510) may query the bitmap index using the Boolean expression. According to some embodiments, querying the bitmap index may include identifying a first set of bitmap index values that satisfy a first data condition, identifying a second set of bitmap index values that satisfy a second data condition and determining a logical combination of bitmap index values that satisfy a logical combination of the first data condition and the second data condition. According to some embodiments, the logical combination of the first data condition and the second data condition may be based on a logical operator associated with the Boolean expression generated by Boolean generator 510.

In decision block 235, the system (e.g., Boolean generator 510 and/or bitmap generator 512) may determine whether the bitmap index values satisfy the one or more data conditions. When the one or more data conditions are not satisfied (e.g., when no subgroup can be identified satisfying all the provided data conditions) the system may return to block 220, in which the system may receive a new input selection of one or more data conditions. When the one or more data conditions are satisfied, the system may move to block 240, in which the system (e.g. bitmap generator 512) generates a bitmap vector. According to some embodiments, the bitmap vector may be generated based on identifying bitmap index values that satisfy the one or more data conditions, including the propensity-based query. In block 245, the system (e.g., bitmap generator 512) may output a first data subset represented by the bitmap vector to the graphical user interface of user device 520. For example, the system may identify the data entries in database 516 that are correlated to the entries in the bitmap vector and accordingly output the first data subset of correlated entries from database 516 to user device 520.

Figure 3:
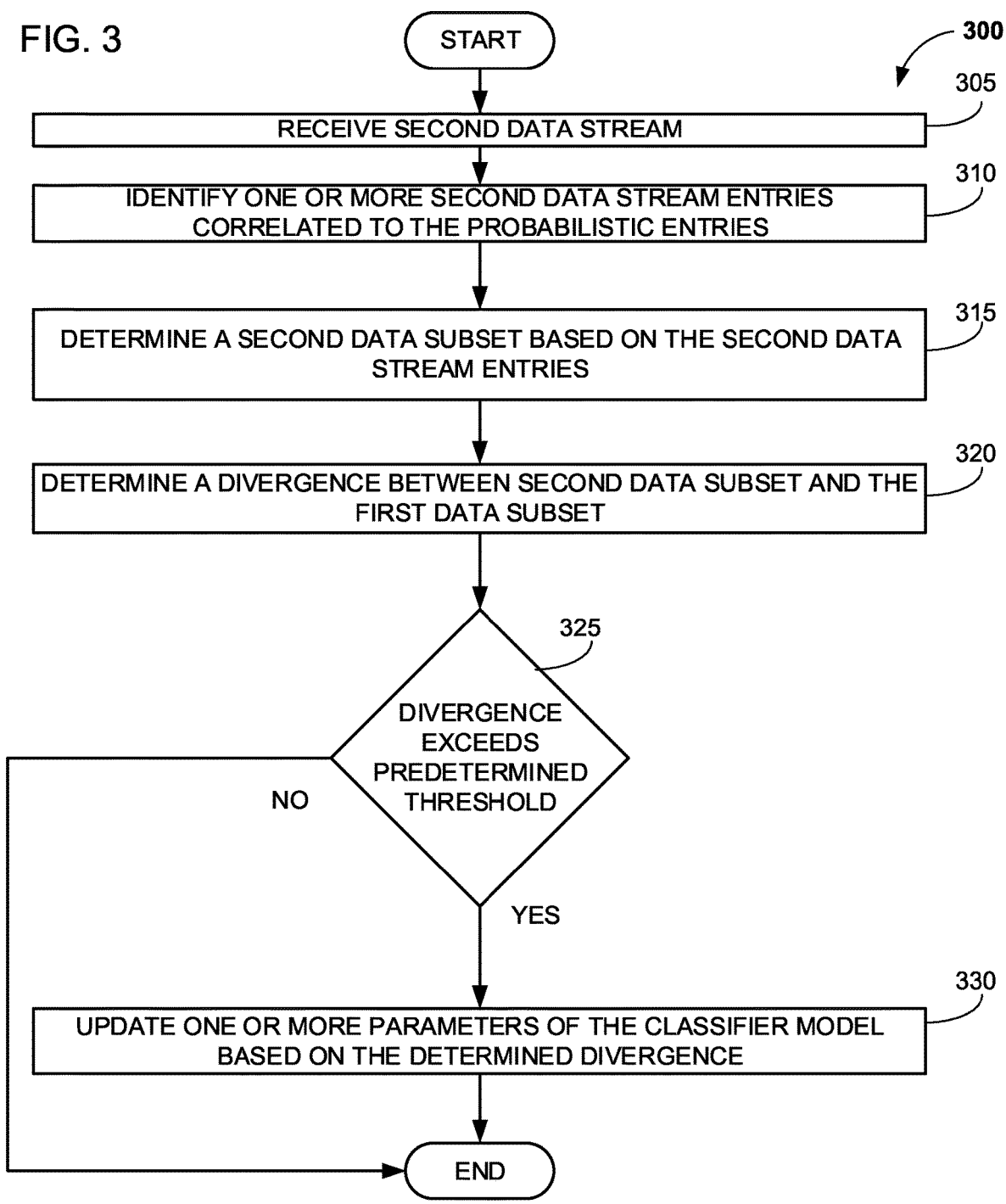
FIG. 3 is a flow diagram 300 illustrating example methods for updating one or more parameters of a classifier model based on determining a divergence between a second data subset and a first data subset, in accordance with certain embodiments of the disclosed technology.

FIG. 3 is a flow diagram 300 illustrating example methods for updating one or more parameters of a classifier model based on determining a divergence between a second data subset and a first data subset. Method 300 may be performed by some or all of Boolean generator 510, bitmap generator 512, validation device 514, database 516, and user device 520, or any useful combination thereof.

In block 305, the system may receive a second data stream. The second data stream may be received by bitmap generator 512. The second data stream may be received from a database, such as database 516. The second data stream may include data indicative of updated customer demographic data, for example, including data associated with the probabilistic entries produced in method 200. In block 310, the system (e.g., bitmap generator 512) may identify one or more second data stream entries correlated to the probabilistic entries determined in method 200. In block 315, the system (e.g., bitmap generator 512) may determine a second data subset based on the second data stream entries. The second data subset may be correlated to the probabilistic bitmap index entries determined in block 240 of method 200. In block 320, the system (e.g., validation device 514) may determine a divergence between the second data subset and the first data subset (e.g., the first data subset as determined in block 245 of method 200). According to some embodiments, the divergence may be determined as a percentage of predicted outcomes that are verified according to the data received in the second data subset. However, an accuracy percentage may not be an ideal metric, especially if being used to determine a divergence for a low probability event. Accordingly, in some embodiments, the divergence may be calculated using a log-loss function. For example, the Log-loss for a given prediction may be given with the following equation:

$$LogLoss_i = -\lceil y_i \ln p_i + (1 - y_i)\ln(1 - p_i)$$

where i is the given observation/prediction, y is the actual value (e.g., whether a customer actually applied for the auto loan based on the second data subset), and p is the prediction probability for a given observation (e.g., the value given by the probabilistic bitmap index)

In decision block 325, the system (e.g., validation device 514) may determine whether the divergence exceeds a predetermined threshold. When the divergence does not exceed the predetermined threshold, method 300 may end. When the divergence exceeds the predetermined threshold, the method may move to block 330. In block 330, the system (e.g., validation device 514) may transmit instructions to bitmap generator 512 to update one or more parameters of the classifier model (e.g., machine learning model 795) based on the determined divergence. According to some embodiments, when the divergence exceeds the predetermined threshold, the classifier model (e.g., machine learning model 795) may be iteratively retrained to more accurately make predictions of customer behavior.

Figure 4:
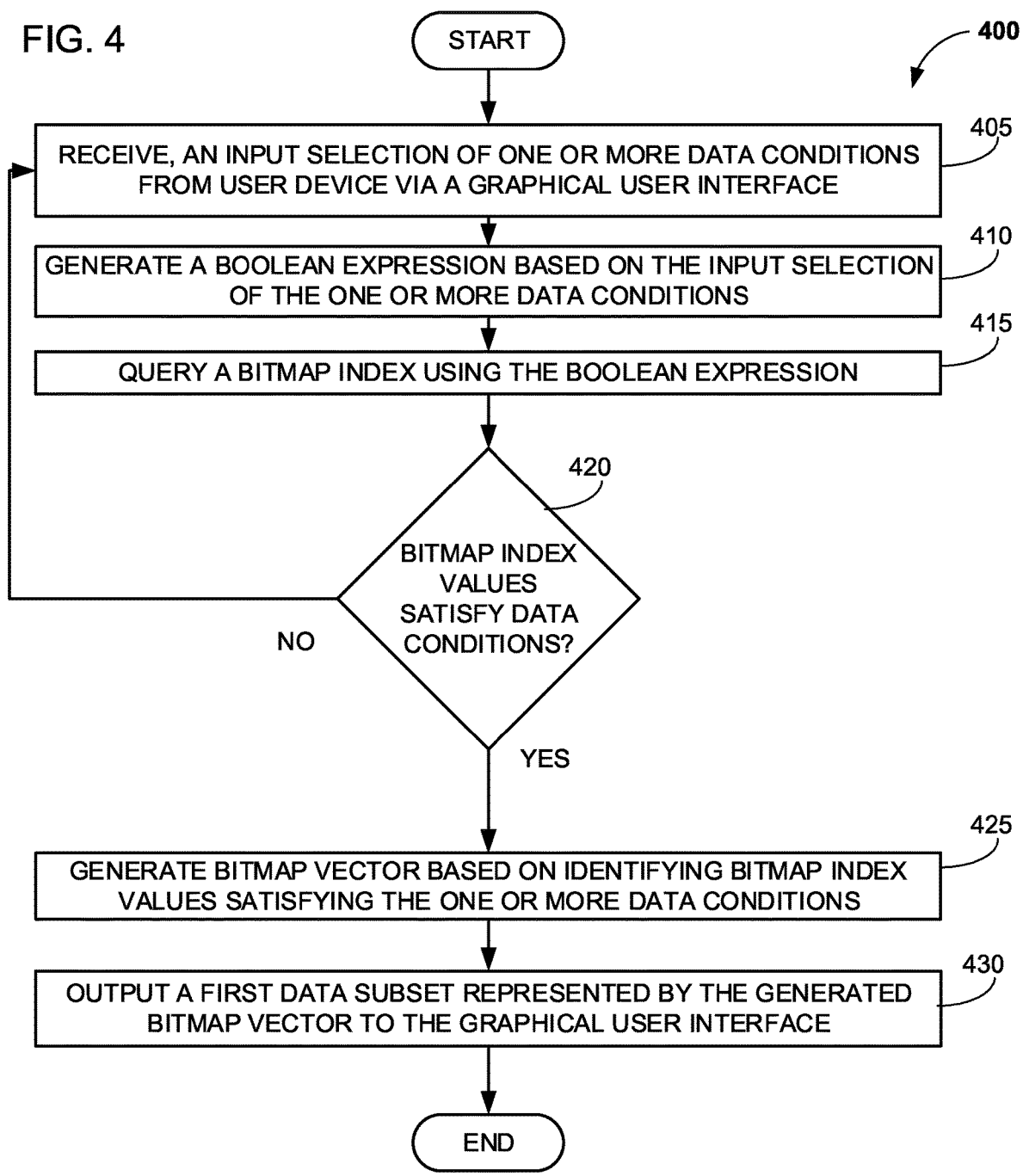
FIG. 4 is a flow diagram 400 illustrating example methods for executing a query on a bitmap index, in accordance with certain embodiments of the disclosed technology.

FIG. 4 is a flow diagram 400 illustrating example methods for executing a query on a bitmap index. Method 400 may be performed by some or all of Boolean generator 510, bitmap generator 512, validation device 514, database 516, and user device 520, or any useful combination thereof.

In block 405, the system (e.g., user device 520) may receive an input selection of one or more data conditions from a user device. According to some embodiments, the input selection is based on a user of user device 520 interacting with a graphical user interface presented to the user on user device 520. According to some embodiments, Boolean generator 510 may generate the graphical user interface and transmit the graphical user interface to user device 520, allowing the user of user device 520 to graphically select one or more data conditions to be applied to determine a target customer data subset. In block 410, the system (e.g., Boolean generator 510) may generate a Boolean expression based on the input selection of the one or more data conditions. For example, Boolean generator 510 may receive the one or more data conditions graphically selected by user device 520 and determine one or more Boolean expressions based on the one or more data conditions. In block 415, the system (e.g., Boolean generator 510) may query the bitmap index using the Boolean expression. According to some embodiments, querying the bitmap index may include identifying a first set of bitmap index values that satisfy a first data condition, identifying a second set of bitmap index values that satisfy a second data condition and determining a logical combination of bitmap index values that satisfy a logical combination of the first data condition and the second data condition. According to some embodiments, the logical combination of the first data condition and the second data condition may be based on a logical operator associated with the Boolean expression generated by Boolean generator 510.

In decision block 420, the system (e.g., Boolean generator 510 and/or bitmap generator 512) may determine whether the bitmap index values satisfy the one or more data conditions. When the one or more data conditions are not satisfied (e.g., when no subgroup can be identified satisfying all the provided data conditions) the system may return to block 405, in which the system may receive a new input selection of one or more data conditions. When the one or more data conditions are satisfied, the system may move to block 425, in which the system (e.g. bitmap generator 512) generates a bitmap vector. According to some embodiments, the bitmap vector may be generated based on identifying bitmap index values that satisfy the one or more data conditions. In block 430, the system (e.g., bitmap generator 512) may output a first data subset represented by the bitmap vector to the graphical user interface of user device 520. For example, the system may identify the data entries in database 516 that are correlated to the entries in the bitmap vector and accordingly output the first data subset of correlated entries from database 516 to user device 520.

Figure 5:
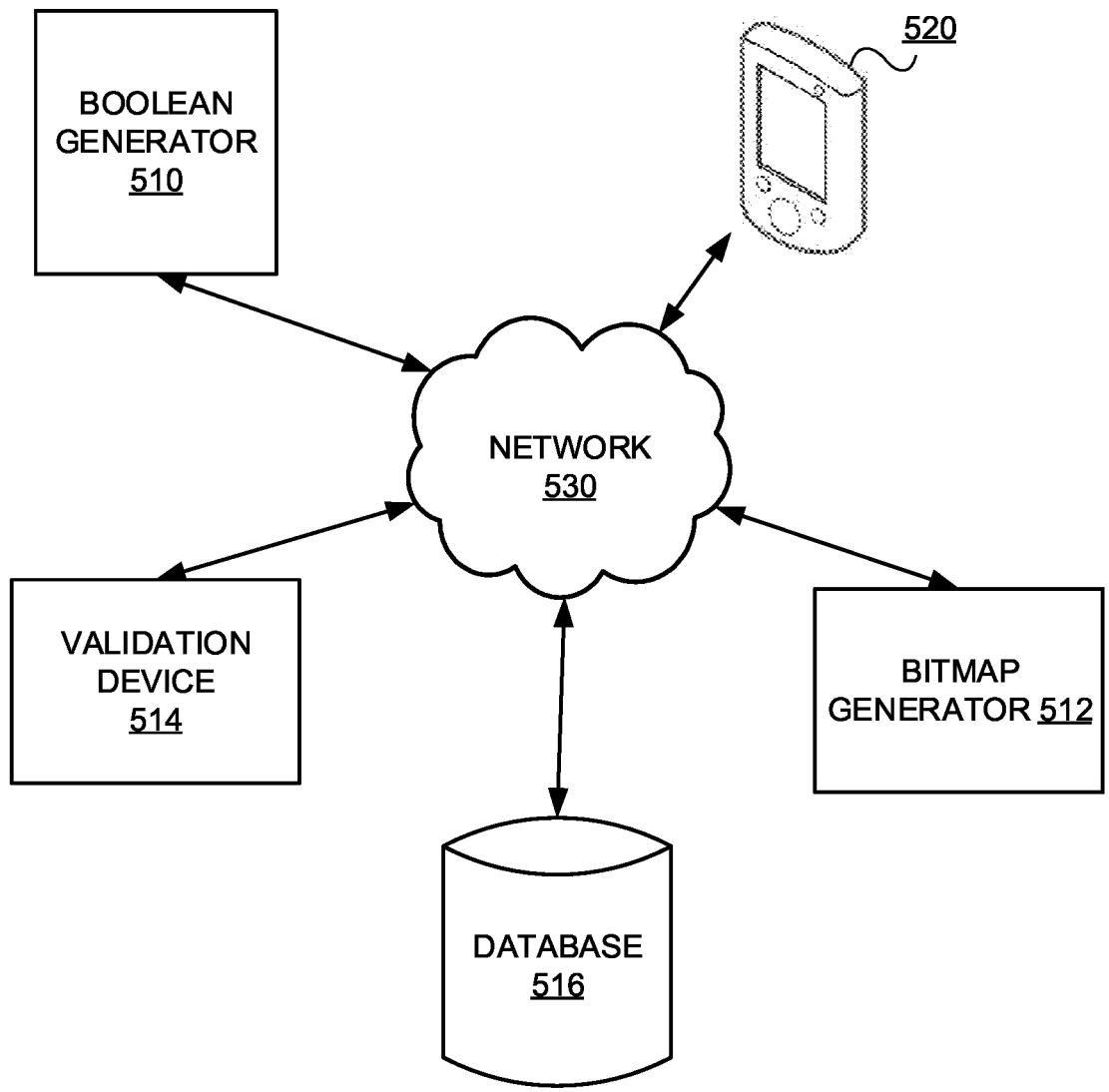
FIG. 5 is a block diagram of an example system 500 that may be used to execute queries on a bitmap index according to one or more data conditions, in accordance with certain embodiments of the disclosed technology.

FIG. 5 is a block diagram of an example system 500 that may be used to execute queries on a bitmap index according to one or more data conditions. The components and arrangements shown in FIG. 5 are not meant to limit the disclosed embodiments as the components used to implement the disclosed processes and features may vary. As shown, system 500 may include a Boolean generator 510, a bitmap generator 512, a validation device 514, a database 516, and a user device 520, all of which may be connected via a network 530.

Boolean generator 510 may include a computer system configured to receive input from user device 520 indicative of data conditions requested by a user of system 500 to determine a target demographic that complies with data conditions. For example, Boolean generator may be configured to generate a Boolean query that may be used to query a database or a bitmap index to determine a target demographic in accordance with provided data conditions. In some embodiments, the data conditions can include, for example, conditions on a yearly income for each customer stored in a database, a credit score associated with each customer stored in a database, a number of accounts associated with a respective customer with a respective financial service provider, the type of accounts a respective customer has with a financial service provider, financial transactions the customer has performed with one or more financial accounts associated with the financial service provider, etc.

Figure 6:
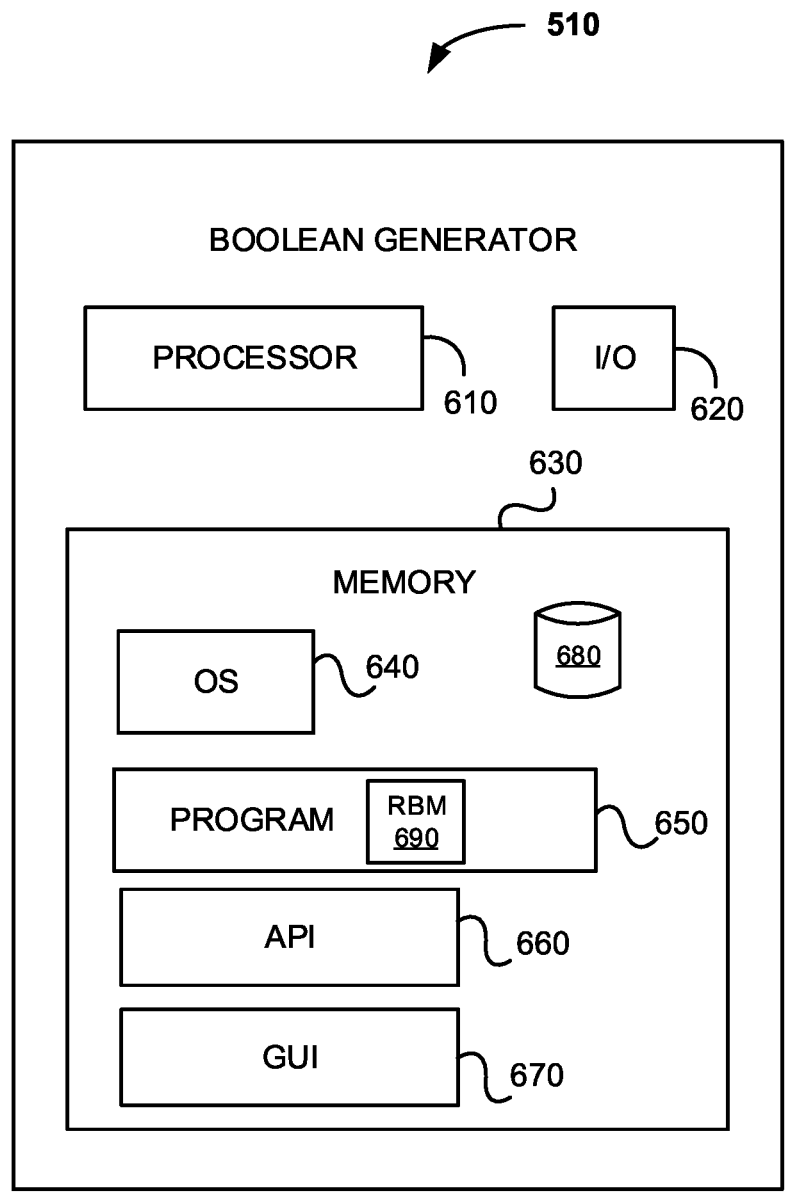
FIG. 6 is a block diagram 600 of an example Boolean generator 510, in accordance with certain embodiments of the disclosed technology.

An example embodiment of Boolean generator 510 is shown in more detail in FIG. 6. Boolean generator may have a structure and components that are similar to those described with respect to bitmap generator 512 and user device 520. As shown, Boolean generator may include a processor 610; an input/output (I/O) device 620; a memory 630, which may contain an operating system 640, a program 650, an application programming interface (API) 660, a graphical user interface (GUI) 670, and a storage device 680, which may be any suitable repository of data. In some embodiments, Boolean generator 510 may include a transceiver. In some embodiments, Boolean generator 510 may include a peripheral interface, a mobile network interface in communication with processor 610, a bus configured to facilitate communication between the various components of Boolean generator 510, and/or a power source configured to power one or more components of Boolean generator 510.

In some embodiments, Boolean generator 510 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices when they are within a predetermined range. A transceiver may be compatible with one or more of: radio-frequency identification (RFID), near-field communication (NFC), Bluetooth™, Bluetooth™ low-energy (BLE) (e.g., BLE mesh and/or thread), Wi-Fi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 610 to communicate with other devices via wired or wireless networks, whether local or wide area, private or public. A power source may be configured to provide an appropriate alternating current (AC) or direct current (DC) to power components.

As described above, Boolean generator 510 may be configured to remotely communicate with one or more other devices, such as bitmap generator 512, validation device 514, database 516, and/or user device 520. In some embodiments, Boolean generator 510 may be configured to communication with one or more devices via network 530. According to some embodiments, Boolean generator 510 may be configured to receive data indicative of one or more data conditions, generate one or more Boolean expressions associated with the one or more data conditions, and transmit the Boolean expressions to one or more of a bitmap generator or a database to determine a target demographic in a customer database.

Processor 610 may include one or more of an application specific integrated circuit (ASIC), programmable logic device, microprocessor, microcontroller, digital signal processor, co-processor or the like or combinations thereof capable of executing stored instructions and operating upon stored data. Memory 630 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 640, application programs 650 (including, for example, a web browser application, a widget or gadget engine, and or other applications, as necessary), executable instructions and data.

In some embodiments, processor 610 may include a secure microcontroller, which may be configured to transmit and/or facilitate Boolean expressions. In some embodiments, some or all of the processing techniques described herein can be implemented as a combination of executable instructions and data within memory 630.

According to some embodiments, memory 630 may include an API 660. API 660 may be configured to receive and transmit instructions from one or more components of system 500, including bitmap generator 512, validation device 514, database 516, and/or user device 520. According to some embodiments, memory 630 may include GUI 670. GUI 670 may be configured to generate a graphical user interface to that can be transmitted to other components of system 500, such as user device 520. According to certain embodiments, graphical user interface 670 may allow for a user of user device 520 to graphically select one or more data conditions that may be transmitted back to Boolean generator 510, allowing Boolean generator 510 to generate one or more Boolean expressions associated with the one or more data conditions.

Processor 610 may be one or more known processing devices, such as a microprocessor from the Pentium™ family manufactured by Intel™, the Turion™ family manufactured by AMD™, or the Cortex™ family or SecurCore™ manufactured by ARM™. Processor 610 may constitute a single-core or multiple-core processor that executes parallel processes simultaneously. For example, processor 610 may be a single core processor that is configured with virtual processing technologies. In certain embodiments, processor 610 may use logical processors to simultaneously execute and control multiple processes. Processor 610 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Boolean generator 510 may include one or more storage devices 680 configured to store information used by processor 610 (or other components) to perform certain functions related to the disclosed embodiments. As an example, Boolean generator 510 may include memory 630 that includes instructions to enable processor 610 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, Boolean generator 510 may include memory 630 that includes instructions that, when executed by processor 610, perform one or more processes consistent with the functionalities disclosed herein. Methods, systems, and articles of manufacture consistent with disclosed embodiments are not limited to separate programs or computers configured to perform dedicated tasks. For example, Boolean generator 510 may include memory 630 that may include one or more programs 650 to perform one or more functions of the disclosed embodiments. Moreover, processor 610 may execute one or more programs 650 located remotely from, for example and not limitation, bitmap generator 512, validation device 514, database 516, or user device 520. For example, Boolean generator 510 may access one or more remote programs 650, that, when executed, perform functions related to one or more disclosed embodiments. In some embodiments, one or more programs 650 may include a rules-based model 690 configured to parse the one or more data conditions provided to Boolean generator 510 (e.g., provided by a user of user device 520) and algorithmically generate one or more Boolean expressions associated with the provided one or more data conditions.

Memory 630 may include one or more memory devices that store data and instructions used to perform one or more features of the disclosed embodiments. Memory 630 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 630 may include software components that, when executed by processor 610, perform one or more processes consistent with the disclosed embodiments. In example embodiments of the disclosed technology, Boolean generator 510 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While Boolean generator 510 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the Boolean generator 510 may include a greater or lesser number of components than those illustrated.

Network 530 may be of any suitable type, including individual connections via the internet such as cellular or Wi-Fi networks. In some embodiments, network 530 may connect terminals, services, and mobile devices using direct connections such as RFID, NFC, Bluetooth™, BLE, Wi-Fi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 530 may comprise any type of computer networking arrangement used to exchange data. For example, network 530 may be the Internet, a private data network, virtual private network using a public network, and/or other suitable connection(s) that enables components in system environment 100 to send and receive information between the components of system 500. Network 530 may also include a PSTN and/or a wireless network.

Figure 7:
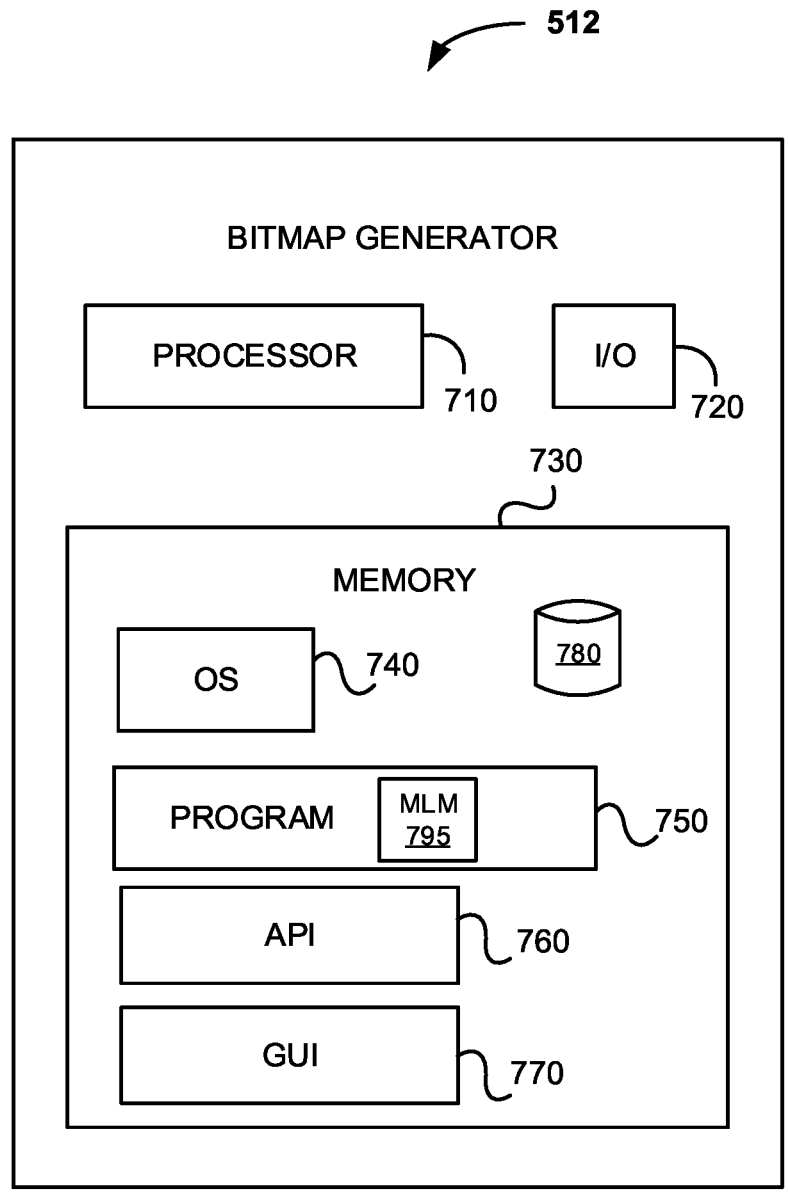
FIG. 7 is a block diagram 700 of an example bitmap generator 512, in accordance with certain embodiments of the disclosed technology.

An example embodiment of bitmap generator 512 is shown in more detail in FIG. 7. Bitmap generator 512 may have a structure and components that are similar to those described with respect to Boolean generator 510. As shown, bitmap generator 512 may include a processor 710; an I/O device 720; and a memory 730 containing an OS 740, a program 750, and API 760, a GUI 770, and a storage device 780, which may be any suitable repository of data and may include a plurality of bitmap indexes generated by the bitmap generator 512 based on data received from database 516. In some embodiments, bitmap generator 512 may include more or fewer components (e.g., the components described herein with respect to Boolean generator 510), and the various components of bitmap generator 512 may include the same or similar attributes or capabilities of the same or similar components discussed with respect to Boolean generator 510.

In some embodiments, bitmap generator 512 may include a transceiver. In some embodiments, bitmap generator 512 may include a peripheral interface, a mobile network interface in communication with processor 710, a bus configured to facilitate communication between the various components of bitmap generator 512, and/or a power source configured to power one or more components of bitmap generator 512.

In some embodiments, bitmap generator 512 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices when they are within a predetermined range. A transceiver may be compatible with one or more of: radio-frequency identification (RFID), near-field communication (NFC), Bluetooth™, Bluetooth™ low-energy (BLE) (e.g., BLE mesh and/or thread), Wi-Fi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 710 to communicate with other devices via wired or wireless networks, whether local or wide area, private or public. A power source may be configured to provide an appropriate alternating current (AC) or direct current (DC) to power components.

As described above, bitmap generator 512 may be configured to remotely communicate with one or more other devices, such as Boolean generator 510, validation device 514, database 516, and/or user device 520. In some embodiments, bitmap generator 512 may be configured to communication with one or more devices via network 530. According to some embodiments, bitmap generator 512 may be configured to receive data indicative of a customer base (e.g., from database 516) and generate one or more bitmap indexes of the data. Bitmap indexes may allow for faster Boolean queries when compared to directly querying database 516 with a Boolean expression.

Returning to FIG. 5, according to some embodiments, a user may operate user device 520. User device 520 can include one or more of a mobile device, smart phone, general purpose computer, tablet computer, laptop computer, telephone, a public switched telephone network (PSTN) landline, smart wearable device, voice command device, other mobile computing device, or any other device capable of communicating with network 530 and/or with one or more components of system 500. User device 520 may belong to or be provided by the user. According to some embodiments, user device 520 may include one or more of: an environmental sensor for obtaining audio or visual data (e.g., a microphone and/or digital camera), a geographic location sensor for determining the location of the device, an input/output device such as a transceiver for sending and receiving data (e.g., via Wi-Fi, cellular communications, near-filed communications, Bluetooth™, and the like), a display for displaying digital images and/or graphical user interfaces generated by components of system 500, one or more processors, and a memory in communication with the one or more processors. According to some embodiments, user device 520 may also include a user interface (U/I) for receiving user input data, such as data representative of a click, a scroll, a tap, a press, a spatial gesture (e.g., as detected by one or more accelerometers and/or gyroscopes), or typing on an input device that can detect tactile inputs. In some embodiments, user device 520 may include a microphone and/or an image capture device, such as a digital camera.

Figure 8:
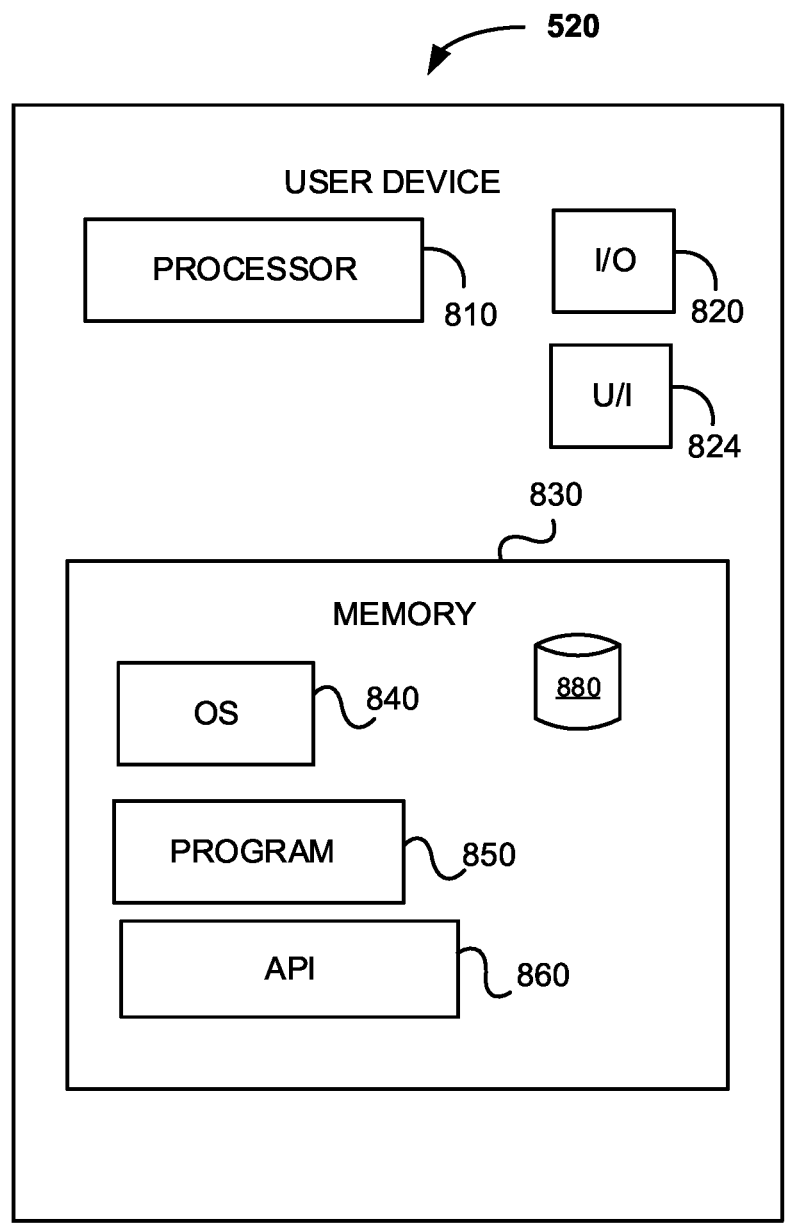
FIG. 8 is a block diagram 800 of an example user device 520, in accordance with certain embodiments of the disclosed technology.

An example embodiments of user device 520 is shown in more detail in FIG. 8. User device 520 may have a similar structure and components that are similar to those described with respect to Boolean generator 510 and/or bitmap generator 512. As shown, user device 520 may include a processor 810; an input/output (I/O) device 820; a user interface 824; a memory 830, which may contain an operating system 840, a program 850, an API 860, and a storage device 880, which may be any suitable repository of data. In some embodiments, user device 520 may include a transceiver. In some embodiments, user device 520 may include a peripheral interface, a mobile network interface in communication with processor 810, a bus configured to facilitate communication between the various components of user device 520, and/or a power source configured to power one or more components of user device 520.

According to some embodiments, user device 520 may be configured to receive a graphical user interface from one or more components of system 500, for example, Boolean generator 510, bitmap generator 512, and/or validation device 514. The graphical user interface may be transmitted the user device 520 to display a target subgroup representative of a demographic subgroup of all customers of a financial service provider based on the identification of a demographic subgroup that satisfies one or more data conditions. Similarly, user device 520 may be configured to receive a graphical user interface from Boolean generator 510 that allows a user of user device 520 to graphically select one or more data conditions based upon which Boolean generator 510 may generate one or more Boolean expressions for querying a bitmap index.

Returning to FIG. 5, system 500 may include validation device 514. Validation device 514 may have a similar structure and components that are similar to those described with respect to Boolean generator 510, bitmap generator 512, and/or user device 520. According to some embodiments, validation device 514 may be configured to validate probabilistic bitmap indexes generated by bitmap generator 512. For example, bitmap generator 512 may generate a probabilistic bitmap associated with, for example, the number of customers from database 116 that are at least 70% likely to apply for an automotive loan in the next month from a respective financial service provider based on associated data previously stored for each customer on database 116. Validation device 514 may be configured to receive updated data from database 116 and determine a divergence between the prediction determined based on probabilistic bitmap indexes generated by bitmap generator 512 and the updated data received from database 116. When validation device 514 determines that the divergence exceeds a predetermined threshold, validation device 514 may transmit instruction to bitmap generator 512 to modify one or parameters of machine learning model 795 to increase an accuracy of probabilistic bitmap indexes generated by bitmap generator 512. According to some embodiments, machine learning model 795 may include a neural network. In some embodiments machine learning model 795 may include the use of a convolutional neural network, a recurrent neural network, and/or a bidirectional neural network, or useful combinations thereof.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IOT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

A user of the system may wish to identify target customer subgroups for a financial service provider. The user may wish to initiate an advertising campaign to the target customer subgroup. For example, the user may wish to define the target customer subgroup and determine the size of the subgroup in order to determine whether the proposed advertising campaign makes business sense for the financial service provider. The user may wish to define the subgroup without having an in-depth knowledge of querying a database. Accordingly, the user of the proposed system may graphically select one or more data conditions to place on the results of the target customer subgroup. For example, the user may wish to target customers that make between $60,000 and $90,000, and have a credit card account associated with the financial service provider. The user may graphically select the desired data conditions to be placed on target customer subgroup. Based on the graphical input, the system (e.g., Boolean generator 510) may automatically generate a Boolean expression which may be used by the system to query a database to determine the target customer subgroup. Additionally, rather than directly querying a database (e.g., database 516) with the Boolean expression, which may be very computationally expensive, the system may generate a bitmap index based on the data stored on the database (e.g., using bitmap generator 512). According to some embodiments, the system (e.g., bitmap generator 512) may generate bitmap indices using a batch process, and store the generated bitmap indices for later use. When a user of the system generates a Boolean expression, the system may call the query the generated bitmap indices rather than directly accessing the database, saving computational resources. Accordingly, the system may query a bitmap index with the Boolean expression. In response, the system may generate a bitmap vector that includes data entries associated with the target customer subgroup. These data entries may be provided to the user via the graphical user interface.

In some, embodiments, the user may wish to determine an advertising campaign based on a propensity-based query. In other words, the user may wish to target a customer demographic based on a future event. The user may wish to target customers that are at least 70% likely to apply for an automotive loan from the financial service provider within the next 3 months. To do so, the user may define a propensity-based query as a data condition using the graphical user interface provided on a user device (e.g., user device 520). The system (e.g., Boolean generator 510) may generate a Boolean expression and bitmap generator 512 may create a bitmap index (e.g., using machine learning model 795) that includes probabilistic data entries. As described above, the system may generate and update bitmap indices in a batched process that is configured to run every evening, every weekend, or any other regular time period. Once a user has defined a propensity-based query, the system may query the bitmap index with the Boolean expression and return a bitmap vector that includes bitmap index values that satisfy the propensity-based query. Accordingly, the user may be presented with a data subset representing the target demographic based on a future event. In certain embodiments, the system may validate (e.g., using validation device 514) the probabilistic bitmap indexes created by bitmap generator 512. For example, after the passage of 3 months, the system may query the database (e.g., database 516) and determine a percentage of customers that were predicted to apply for an auto loan within 3 months that indeed applied for the automotive loan within the time period. When the divergence between the predicted customer group and the actual customer group exceeds a predetermined threshold, the system may update one or more parameters of the classifier model employed by bitmap generator 512 (e.g., by updating one or more parameters of machine learning model 795).

Examples of the present disclosure relate to systems and methods for executing queries on a bitmap index. In a variety of aspects, a system for executing queries on a bitmap index. The system may implement a method according to the disclosed embodiments. The system may include one or more processors and a memory in communication with the one or more processors. The system may receive a first data stream from a data store. The system may generate a bitmap index of the first data stream. The system may receive, from a user via a graphical user interface, an input selection of one or more data conditions. The system may generate a Boolean expression based on the input selection of the one or more data conditions. The system may query the bitmap index using the Boolean expression. The system may generate a bitmap vector based on identifying bitmap index values that satisfy the one or more data conditions. The system may output a first data subset represented by the generated bitmap vector to the graphical user interface.

In some embodiments, the one or more data conditions may include at least one propensity-based query. In some embodiments, generating the bitmap index of the first data stream may include processing the first data stream according to a classifier model to identify probabilistic data attributes in the first data stream and generating a bitmap index including probabilistic entries satisfying the at least one propensity-based query. In some embodiments, the system may be further configure to receive a second data stream, identify one or more second data stream entries correlated to the probabilistic entries, determine a second data subset based on the second data stream entries, determine a divergence between the second data subset and the first data subset, and update one or more parameters of the classifier model based on the determined divergence.

In some embodiments, the classifier model may further include a model selected from a convolutional neural network, a recurrent neural network, a bidirectional neural network, or combinations thereof. In some embodiments, the generated bitmap vector may include a sparse vector. In some embodiments, the bitmap index may further include a range-encoded bitmap index. In some embodiments, the bitmap index may further include a bit-slice bitmap index. In some embodiments, the system is further configured to iteratively update the first bitmap index at a predetermined time interval.

In some embodiments, querying the bitmap index using the Boolean expression may further include identifying a first set of bitmap index values that satisfy a first data condition of the one or more data conditions, identifying a second set of bitmap index values that satisfy a second data conditions of the one or more data conditions, and determining a logical combination of bitmap index values satisfying a logical combination of the first data condition and the second data condition, the logical combination based on a logical operator associated with the Boolean expression.

In a variety of aspects, a system for executing queries on a bitmap index is disclosed. The system may include one or more processors, and a memory in communication with the one or more processors. The system may receive a first data stream from a data store. The system may identify probabilistic data attributes in the first data stream according to a classifier model. The system may generate a bitmap index including probabilistic entries identified in the first data stream. The system may receive, from a user via a graphical user interface, an input selection of one or more data conditions including at least one propensity-based inquiry. The system may generate a Boolean expression based on the input selection of the one or more data conditions. The system may query the bitmap index using the Boolean expression. The system may generate a bitmap vector based on identifying bitmap index values that satisfy the one or more data conditions. The system may output a first data subset represented by the generated bitmap vector to the graphical user interface.

In some embodiments, the classifier model may further include a model selected from a convolutional neural network, a recurrent neural network, a bidirectional neural network, or combinations thereof. In some embodiments, the generated bitmap vector may include a sparse vector. In some embodiments, the bitmap index may further include a range-encoded bitmap index. In some embodiments, the system is further configured to iteratively update the bitmap index at a predetermined time interval.

In a variety of aspects, a computer-implemented method for executing queries on a bitmap index is disclosed. The method may include receiving, from a user via a graphical user interface, an input selection of one or more data conditions. The method may include generating a Boolean expression based on the input selection of the one or more data conditions. The method may include querying a bitmap index using the Boolean expression. The system may include generating a bitmap vector based on identifying bitmap index values that satisfy the one or more data conditions. The method may include outputting a first data subset represented by the generated bitmap vector to the graphical user interface.

In some embodiments, the one or more data conditions may include at least one propensity-based query. In some embodiments, generating the bitmap index of the first data stream may include processing the first data stream according to a classifier model to identify probabilistic data attributes in the first data stream and generating a bitmap index including probabilistic entries satisfying the at least one propensity-based query.

In some embodiments, the generated bitmap vector may include a sparse vector. In some embodiments, the method may further include generating a bitmap index including a range-encoded bitmap index. In some embodiments, the bitmap index may further include a bit-slice bitmap index.

What is claimed is:
1. A system for executing queries on a bitmap index, the system comprising:
   one or more processors; and
   a memory in communication with the one or more processors and storing instructions that, when executed by the one or more processors, cause the system to:
      receive a first data stream from a data store;
      determine, using a machine learning model, predicted customer behavior based on the first data stream;
      generate, using the machine learning model, a bitmap index of the first data stream based on the predicted customer behavior associated with historical customer data;
      generate a graphical user interface comprising an input selection of one or more data conditions;
      transmit the graphical user interface to a user device of a user;
      receive, from the user device of the user, the input selection of one or more data conditions comprising at least one propensity-based inquiry;
      generate a Boolean expression based on the input selection of the one or more data conditions;
      query the bitmap index using the Boolean expression;
      generate a bitmap vector based on identifying bitmap index values that satisfy the one or more data conditions;
      modify the graphical user interface to generate a modified graphical user interface comprising the generated bitmap vector and a first data subset represented by the generated bitmap vector;

transmit the modified graphical user interface to the user device;
determine whether a first divergence between the predicted customer behavior and the first data subset exceeds a predetermined threshold; and
responsive to determining the first divergence exceeds the predetermined threshold, retrain the machine learning model by adjusting one or more parameters of the machine learning model to generate updated predicted customer behavior.

2. The system of claim 1:
wherein the one or more data conditions comprises at least one propensity-based query; and
wherein generating the bitmap index of the first data stream comprises:
processing the first data stream according to a classifier model to identify probabilistic data attributes in the first data stream; and
generating a bitmap index comprising probabilistic entries satisfying the at least one propensity-based query.

3. The system of claim 2, wherein the system is further configured to:
receive a second data stream;
identify one or more second data stream entries correlated to the probabilistic entries;
determine a second data subset based on the second data stream entries;
determine a divergence between the second data subset and the first data subset; and
update one or more parameters of the classifier model based on the determined divergence.

4. The system of claim 3, wherein the classifier model further comprises a model selected from a convolutional neural network, a recurrent neural network, a bidirectional neural network, or combinations thereof.

5. The system of claim 1, wherein the generated bitmap vector comprises a sparse vector.

6. The system of claim 1, wherein the bitmap index further comprises a range-encoded bitmap index or a bit-slice bitmap index.

7. The system of claim 1, wherein the predicted customer behavior comprises a predicted likelihood of one or more customer actions and wherein the bitmap index of the first data stream is generated based on the predicted likelihood of the one or more customer actions.

8. The system of claim 1, wherein querying the bitmap index using the Boolean expression comprises:
identifying a first set of bitmap index values that satisfy a first data condition of the one or more data conditions;
identifying a second set of bitmap index values that satisfy a second data condition of the one or more data conditions; and
determining a logical combination of bitmap index values satisfying a logical combination of the first data condition and the second data condition, the logical combination of the bitmap index values based on a logical operator associated with the Boolean expression.

9. A system for executing queries on a bitmap index, the system comprising:
one or more processors;
a memory in communication with the one or more processors and storing instructions that, when executed by the system, cause the system to:
receive a first data stream from a data store;
generate, using a machine learning model, predicted customer behavior based on the first data stream;
identify probabilistic data attributes in the first data stream according to a classifier model;
generate, using the machine learning model, a bitmap index of the first data stream based on the predicted customer behavior associated with historical customer data;
generate a graphical user interface comprising an input selection of one or more data conditions comprising at least one propensity-based inquiry;
transmit the graphical user interface to a user device of a user;
receive, from the user device of the user, the input selection of one or more data conditions comprising at least one propensity-based inquiry;
generate a Boolean expression based on the input selection of the one or more data conditions;
query the bitmap index using the Boolean expression;
generate a bitmap vector based on identifying bitmap index values that satisfy the one or more data conditions;
modify the graphical user interface to comprise the generated bitmap vector and a first data subset represented by the generated bitmap vector;
transmit the modified graphical user interface to the user device; and
retrain the machine learning model by adjusting one or more parameters of the machine learning model to generate updated predicted customer behavior.

10. The system of claim 9, wherein the classifier model further comprises a model selected from a convolutional neural network, a recurrent neural network, a bidirectional neural network, or combinations thereof.

11. The system of claim 9, wherein the generated bitmap vector comprises a sparse vector.

12. The system of claim 9, wherein the bitmap index further comprises a range-encoded bitmap index or a bit-slide bitmap index.

13. The system of claim 9, wherein the system is further configured to iteratively update the bitmap index at a predetermined time interval.

14. The system of claim 9, wherein the probabilistic data attributes in the first data stream are identified by a classifier model using probabilistic predictions based on customer data in the first data stream.

15. A computer-implemented method for executing queries on a bitmap index, the method comprising:
generating, using a machine learning model, predicted customer behavior;
generating, using the machine learning model, a bitmap index of a first data stream based on the predicted customer behavior associated with historical customer data;
generating a graphical user interface comprising an input selection of one or more data conditions;
transmitting the graphical user interface to a user device of a user;
receiving, from the user device of the user, the input selection of one or more data conditions comprising at least one propensity-based inquiry;
generating a Boolean expression based on the input selection of the one or more data conditions;
querying the bitmap index using the Boolean expression;
generating a bitmap vector based on identifying bitmap index values that satisfy the one or more data conditions;
modifying the graphical user interface to generate a modified graphical user interface comprising the generated bitmap vector and a first data subset represented by the generated bitmap vector;

transmitting the modified graphical user interface to the user device; and retraining the machine learning model by adjusting one or more parameters of the machine learning model to generate updated predicted customer behavior.

16. The method of claim 15:

wherein the one or more data conditions comprises at least one propensity-based query; and wherein generating the bitmap index of the first data stream comprises:

processing the first data stream according to a classifier model to identify probabilistic data attributes in the first data stream; and generating a bitmap index comprising probabilistic entries satisfying the at least one propensity-based query.

17. The method of claim 15, wherein the generated bitmap vector comprises a sparse vector.

18. The method of claim 15, further comprising generating a bitmap index comprising a range-encoded bitmap index.

19. The method of claim 15, wherein the bitmap index further comprises a bit-slice bitmap index.

20. The method of claim 15, wherein the bitmap index of the first data stream is generated by identifying a target population subset based on probabilistic predictions, and wherein the bitmap index comprises probabilistic data entries.

* * * * *